United States Patent

Rumford et al.

Patent Number: 5,152,141
Date of Patent: Oct. 6, 1992

[54] MANAGEMENT OF ELECTRICALLY DRIVEN ENGINE ACCESSORIES

[75] Inventors: Kimball J. Rumford, Fairfield; Avi Ben-Porat, Norwalk, both of Conn.; George Hudson, Great Barrington, Mass.

[73] Assignee: Avco Corporation, Providence, R.I.

[21] Appl. No.: 682,595

[22] Filed: Apr. 8, 1991

[51] Int. Cl.⁵ .................................................. F02G 3/00
[52] U.S. Cl. .................................. 60/39.02; 60/39.142
[58] Field of Search ............... 60/39.02, 39.33, 39.142; 318/102, 103; 307/9.1, 38, 41; 361/166

[56] References Cited

U.S. PATENT DOCUMENTS

| | | | |
|---|---|---|---|
| 2,102,514 | 12/1937 | Clarkson | 184/6 |
| 2,798,166 | 7/1957 | Karen | 307/18 |
| 2,949,906 | 8/1960 | Voigt | 123/179 |
| 2,989,644 | 6/1961 | Schultz | 290/36 |
| 3,290,963 | 12/1966 | Oldfield et al. | 60/39.142 |
| 3,937,974 | 2/1976 | Lafuze | 60/39.142 |
| 4,157,124 | 6/1979 | Poore | 60/39.33 |
| 4,165,727 | 8/1979 | Fitzner et al. | 123/179 B |
| 4,356,402 | 10/1982 | Morimoto et al. | 307/19 |
| 4,410,808 | 10/1983 | Woodhouse | 361/166 |
| 4,433,249 | 2/1984 | Long | 307/31 |
| 4,458,644 | 7/1984 | Papst | 123/196 S |
| 4,465,942 | 8/1984 | Deicke | 307/9 |
| 4,475,493 | 10/1984 | Masteller et al. | 123/179 B |
| 4,502,431 | 3/1985 | Lulich | 123/179 A |
| 4,542,722 | 9/1985 | Reynolds | 60/39.142 |
| 4,628,877 | 12/1986 | Sundles et al. | 123/196 S |
| 4,819,423 | 4/1989 | Vershure, Jr. et al. | 60/39.02 |
| 4,885,909 | 12/1989 | Rodgers | 60/39.02 |
| 4,893,598 | 1/1990 | Stasiuk | 12/196 S |
| 4,897,554 | 1/1990 | Uehara et al. | 307/38 |
| 4,940,114 | 7/1990 | Albrecht | 184/6.3 |

FOREIGN PATENT DOCUMENTS

| | | |
|---|---|---|
| 0662708 | 5/1963 | Canada . |
| 1136539 | 9/1962 | Fed. Rep. of Germany . |
| 1041587 | 9/1966 | United Kingdom . |

*Primary Examiner*—Richard A. Bertsch
*Assistant Examiner*—Howard R. Richman
*Attorney, Agent, or Firm*—Perman & Green

[57] ABSTRACT

A plurality of accessories operatively associated with a gas turbine engine are driven by electric motors. A first motor controller initiates operation of a starter/generator mechanically coupled to the engine. After the engine has been started, the motor controller is used to accelerate other accessory motors at a predetermined rate after which they are each electrically coupled to the starter/generator for continued operation. Throughout this operation, the first motor controller serves as a back up for a second motor controller which is dedicated to the operation of a fuel pump motor. Other modes of operation can be achieved as well by reason of the flexibility provided by motor driven accessories.

10 Claims, 3 Drawing Sheets

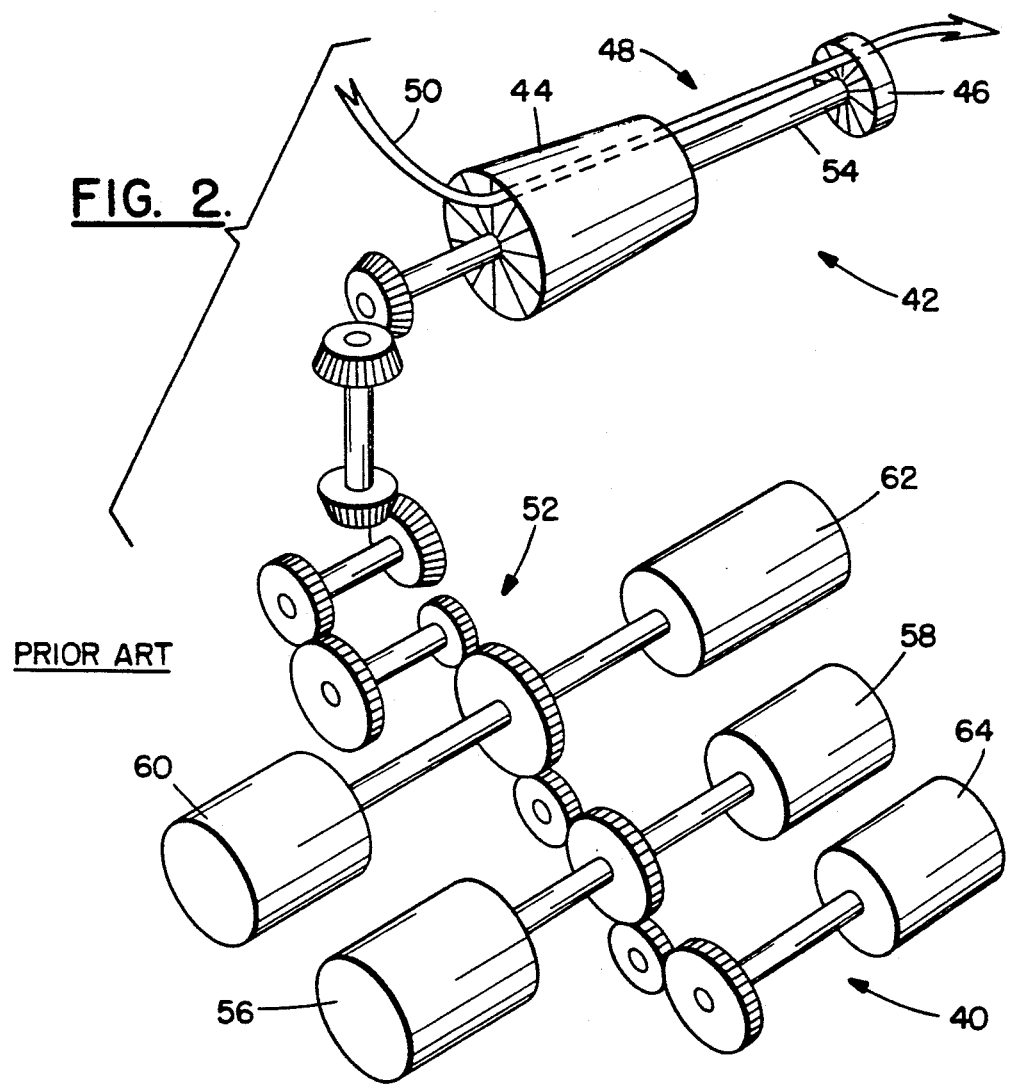

MANAGEMENT OF ELECTRICALLY DRIVEN ENGINE ACCESSORIES

BACKGROUND OF THE INVENTION

1. Field of the Invention

The present invention relates generally to a method of operating a plurality of components operatively associated with a gas turbine engine.

In the next generation of high performance aircraft, engines will be lighter, more efficient, and faster responding and will require more reliable, fault-tolerant controls and accessories. Since the traditional hydromechanical approaches utilize mature technologies, electrical technologies look promising and are being investigated to meet these increased demands. Advances in power electronics and machine technologies are making electric accessory applications possible. Key enabling technologies supporting these applications include the development of electronic devices such as the power MOSFET (metal oxide semiconductor field effect transistor), the IGBT (insulated gate bipolar transistor), the ceramic capacitor, and the MCT (MOS controlled thyristor).

2. Description of the Prior Art

In the traditional hydromechanical system, controls and accessory components are driven from a gearbox that is mechanically coupled to the gas generator shaft. In the new approach, the gearbox is replaced by electric motors which drive the accessories independently. This approach has the potential of greatly simplifying or even eliminating the engine accessory gearbox and providing greater flexibility in locating the accessories on the engine.

Key components for the successful application of electric controls and accessories include a starter/generator capable of operating at engine compressor speeds, an electric motor driven engine fuel pumping system, and an electric motor driven lubricating oil pumping system. Small lightweight power electronics are essential for this new approach to be a viable alternative to the existing technology. In designing aircraft turbine engines with electric controls and accessories, consideration must be given to which functions can be accomplished with electric drives. Typical functions of small engine accessories that are amenable to electric drive applications are engine starting, fuel pumping, lubricating oil pumping, as already noted, and inlet particle separation, and electric power generation.

For a complete understanding of the invention, it is noteworthy that the term "starter/generator" is used throughout the disclosure to mean a device which operates as a starter at low speeds, that is, below idle, and operates to generate electricity at higher speeds, that is, above idle. The term "idle speed", when referring to gas turbine engines, is taken to mean the minimum operational speed, that is, approximately 50% of the maximum speed of which the engine is capable.

All electric accessories customarily receive control signals from the main engine computer. During normal operation, the engine starter is required for less than a minute for each start attempt and is not used after completion of engine starting. It is generally sized to produce adequate torque to start the engine. Electric power generation is usually initiated after the starter has been turned off. This situation lends itself to a natural integration of the starting and generating function into one electrical machine — the starter/generator. This combination implies that the starter/generator be connected to the engine compressor shaft either through a gearbox or directly coupled. When directly coupled, a starter generator may be required to have a rotational speed capability in excess of 50,000 rpm, a common speed for small engines.

Modern small motors used for driving the accessories just mentioned are preferably brushless machines which conventionally require their own electronic power supply or motor controller for starting and, thereafter, for regulating its speed as long as the gas turbine engine continues to operate. The development of brushless controllable speed motors has made rapid strides in the last decade. Brushless motor concepts emerged in the 1930's with the advent of vacuum tube power control systems and the need for speed and position control of motors. Patents from that period indicate much activity from that time on. However, apparently the state of the technology did not support the inventions to the point of commercial use of any significance.

It took the availability of modern semiconductors and new magnet materials, together with the requirements of the automation industry to spur the development of the modern brushless servo or controllable speed and position motors. With the rapid expansion of electronic and magnetic technology in the last three decades, great changes have indeed taken place in the area of speed and position motor control. The development did not always follow the most efficient path; instead, in each time period, it would concentrate in areas of greatest need, available components, cost of components and the level of understanding the control technology.

Thus, the electronic development in the 1960's was influenced mainly by the development of transistor circuits and the analog operational amplifier and associated components. The subsequent development of low cost logic components, memory arrays and eventually the microprocessor steered development in more recent years towards control systems which became capable of retaining and processing information, and thus able to handle increasingly more complex calculations.

In the area of power control, the early development of the thyristor (SCR), and around the same time, power transistors provided new methods for controlling electric power in an efficient manner, on both the high and low end of the power and frequency spectrum. These devices enabled designers to make amplifiers and inverters for servo control purposes, with the greatest impact on high-power applications using thyristors (notably the current source inverter). In the lower-power end (below 5 kW), the transistor became an efficient power conversion device especially when the pulse width modulation and pulse frequency modulation techniques became practical.

Concurrently, with the development of electronic power conversion device, the development of brushless controllable motors proceeded along several different lines. The availability, in time, of several different permanent magnet materials (such as ALNICO varieties, ferrites, and more recently rare earth magnet materials) offers opportunities for design of a variety of servo type motors for applications ranging from digital tape transport systems to machine tool axis drives and, indeed, now to drives for accessories for gas turbine engines. A particular benefit of the rare earth magnetic materials resides in the high flux levels thereby provided per unit weight. This, in turn, results in a significant reduction of the rotor moment of inertia which can be achieved in comparison with other competitive equivalent motors.

It was earlier mentioned that a.c. motors are preferred for operating the accessories of a gas turbine engine. While the speed of a conventional d.c. motor can be readily regulated, a most desirable feature, inherent in d.c. motor design are the mechanical commutator and the brushes, which wear out and require continuous maintenance. Such problems are eliminated, however, in the a.c. motor which has brushless construction and, therefore, is highly reliable and requires very low maintenance. Additionally, the a.c. motor can operate at higher speeds than its d.c. counterpart and hence has high power to volume and weight ratio. Furthermore, due to its inherently simple structure, it can be built ruggedly and economically. In short, a.c. motors are preferred for their simplicity, lightness, and maintainability.

A.c. motor operation is based on the concept of the rotating magnetic field. This rotating magnetic field is generated by the stator windings carrying polyphase currents. The speed of rotation of the magnetic field is directly proportional to the frequency of the polyphase currents, referred to as synchronous speed. For example, for a 60 Hz, two pole motor, the synchronous speed is 3600 rpm. The most efficient way to change speed is to vary the input frequency. This function is performed by means of an electronic motor controller of the modern type, also as noted earlier.

As stated earlier, the next generation of gas turbine engines will employ a starter/generator that first starts the engine, then serves to power electrically driven accessories such as the oil pump, fuel pump, cooler fans, and the like. Since the small motors used for driving the accessories are conventionally brushless machines, they require electronic power supplies, usually one for each motor, for starting and, thereafter, for speed control. Indeed, the fuel pump motor customarily utilizes a dual power supply for fail-safe operation. It was with recognition of the excessive weight, complexity, and expense of providing and operating such a system having a plurality of motors, each with its own power supply or motor controller, that the present invention has been conceived and is now reduced to practice.

SUMMARY OF THE INVENTION

According to the present invention, a plurality of accessories operatively associated with a gas turbine engine are driven by electric motors. A first motor controller initiates operation of a starter/generator mechanically coupled to the engine. After the engine has been started, the motor controller is used to accelerate other accessory motors at a predetermined rate after which they are each electrically coupled to the starter/generator for continued operation. After completing these operations, the first motor controller serves as a back up for a second motor controller which is dedicated to the operation of a fuel pump motor.

Other modes of operation can be achieved as well by reason of the flexibility provided by motor driven accessories. For example, it may be desirable not to couple an accessory motor to the starter/generator during the operation of the gas turbine engine. In the instance of a cooling fan when operating in a cold climate, or when traveling from a warm climate to a cold climate, or visa versa, it may be desirable to continue to operate the accessory motor by its motor controller according to a predetermined schedule and not proportional to the engine speed. Such a situation can also be accommodated by the present invention.

By reason of the mode of operation contemplated by the present invention, complex gear trains and associated hydraulic lines are substantially reduced, or even eliminated, resulting in reduced cost, weight, maintenance, and vulnerability while substantially increasing reliability of the system. Other benefits include increased flexibility of accessory location on, or in relation to, the gas turbine engine as well as improved diagnostics which allow for operation of the accessories for checkout without having to actually operate the engine. Furthermore, the invention eliminates the multiplicity of motor controllers that are necessary in more modern designs in which every accessory is driven by its own individual motor controller.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 2 is a diagrammatic representation of a hydromechanical system known to the prior art for operating accessories and intended to be replaced by the invention;

DETAILED DESCRIPTION OF THE PREFERRED EMBODIMENTS

Figure 1:
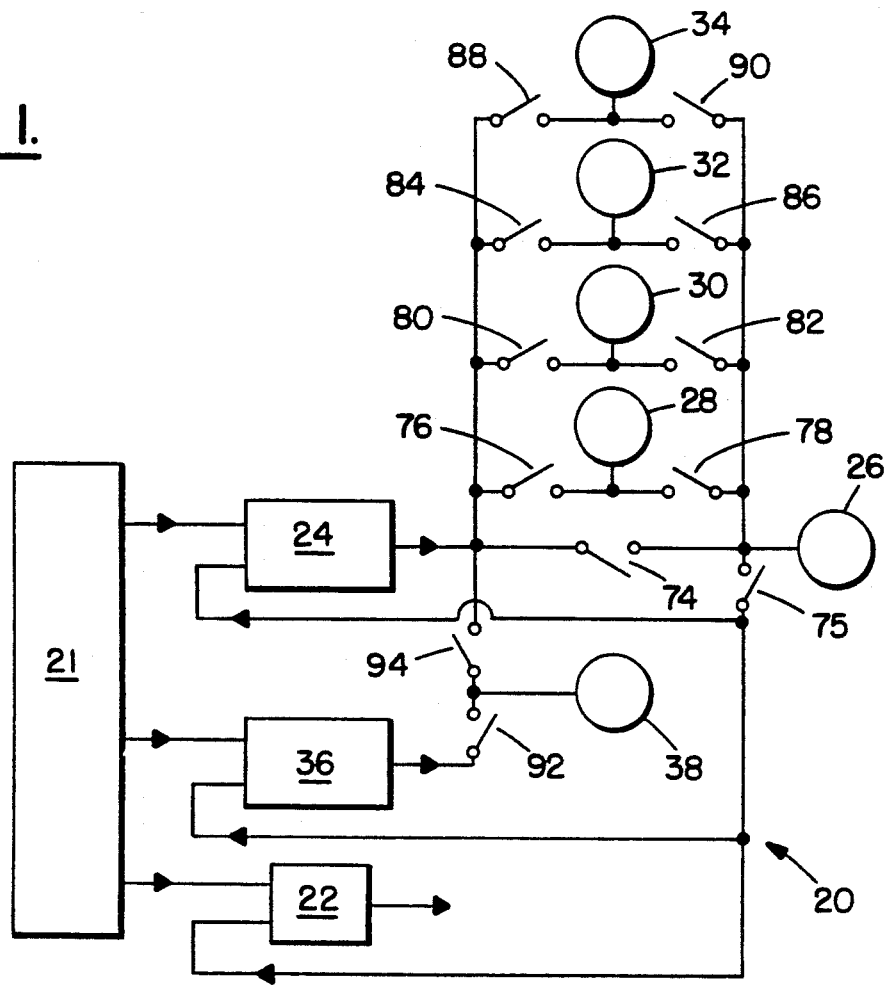
FIG. 1 is a schematic representation of a control system, in accordance with the invention, for operating a plurality of accessories associated with a gas turbine engine.

Turn now to the drawings and, initially, to FIG. 1 which diagrammatically illustrates a control system 20 embodying the invention. The control system serves to start and maintain operation of a plurality of accessories for a gas turbine engine utilized as the prime mover for a vehicle. The control system 20 is powered from the electric power system 21 of the vehicle and is under the general authority of a main computer 22. A common electronic unit is provided in the form of a motor controller 24 for initiating operation of a starter/generator 26 and, thereafter, for starting a plurality of electric motors 28, 30, 32, and 34 for driving associated accessories. In typical fashion, the motor 28 may be mechanically coupled to an oil pump, the motor 30 may be coupled to an inlet particle separator blower, and the motor 32 may be mechanically coupled to a cooler fan. The motor 34 is representative of one or more motors which are mechanically coupled to one or more other accessories for the gas turbine engine, as appropriate.

Once started, most of the motors just mentioned are thereafter electrically coupled to the starter/generator 26 for the duration of their operation. Also provided within the control system 20 is a second motor controller 36 which is dedicated for starting and controlling continuously a fuel pump motor 38.

The control system 20, which will be described in greater detail below, is a replacement for hydromechanical systems having the nature of a system 40 as illustrated in FIG. 2. A gas turbine engine 42 is diagrammatically depicted as having a compressor 44, power turbine 46, and combustor region 48, and airflow therethrough is represented by an arrow 50. According to this earlier construction, a complex gear train or transmission 52 was customarily utilized to connect a power shaft 54 of the gas turbine engine to a plurality of accessories associated with the engine. These accessories typically include a starter/generator 56, a fuel pump 58, an oil pump 60, a cooling fan 62, and an inlet particle separator 64. Of course, these accessories are by way of example only and, in an actual system, may be much larger in number.

Figure 3:
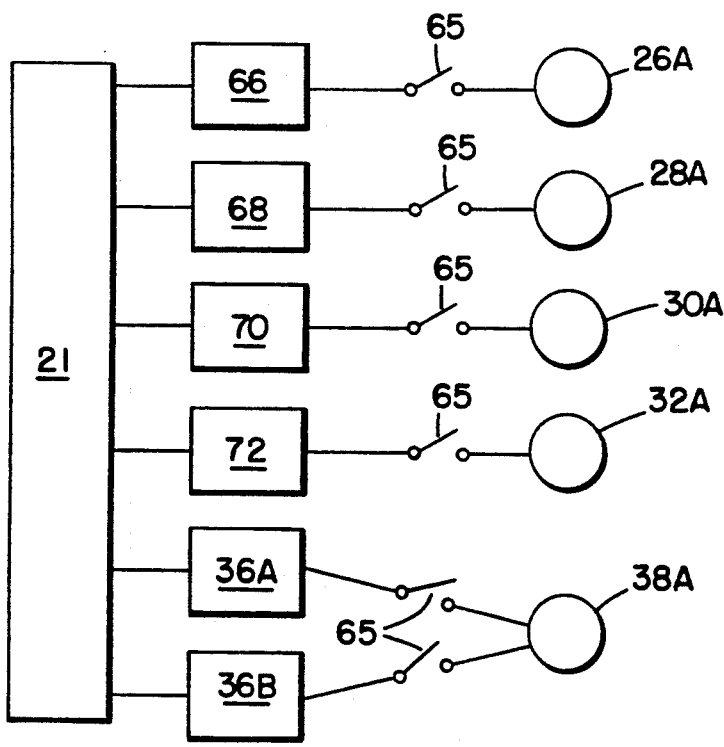
FIG. 3 is a schematic representation of an electric control system known to the prior art for operating accessories and intended to be replaced by the invention.

More recently, with the advent of smaller and more powerful electric motors and their associated motor controllers, it has become customary to drive accessories such as those depicted in FIG. 2 electrically rather than mechanically. Thus, as seen in FIG. 3, upon actuation of associated switches 65, a starter/generator 26A is operated by its associated motor controller 66; a motor 28A for driving a lubrication oil pump is operated by a motor controller 68; a motor 30A for driving an inlet particle separator is operated by a motor controller 70; and a motor 32A for driving a cooling fan for cooling oil in the sump of the gas turbine engine is operated by a motor controller 72. A motor 38A for driving the fuel pump typically operates at its own special speed and, in addition to having a first dedicated motor controller 36A, has a second dedicated motor controller 36B which operates as a backup in the event the first motor controller becomes inoperable.

Figure 4:
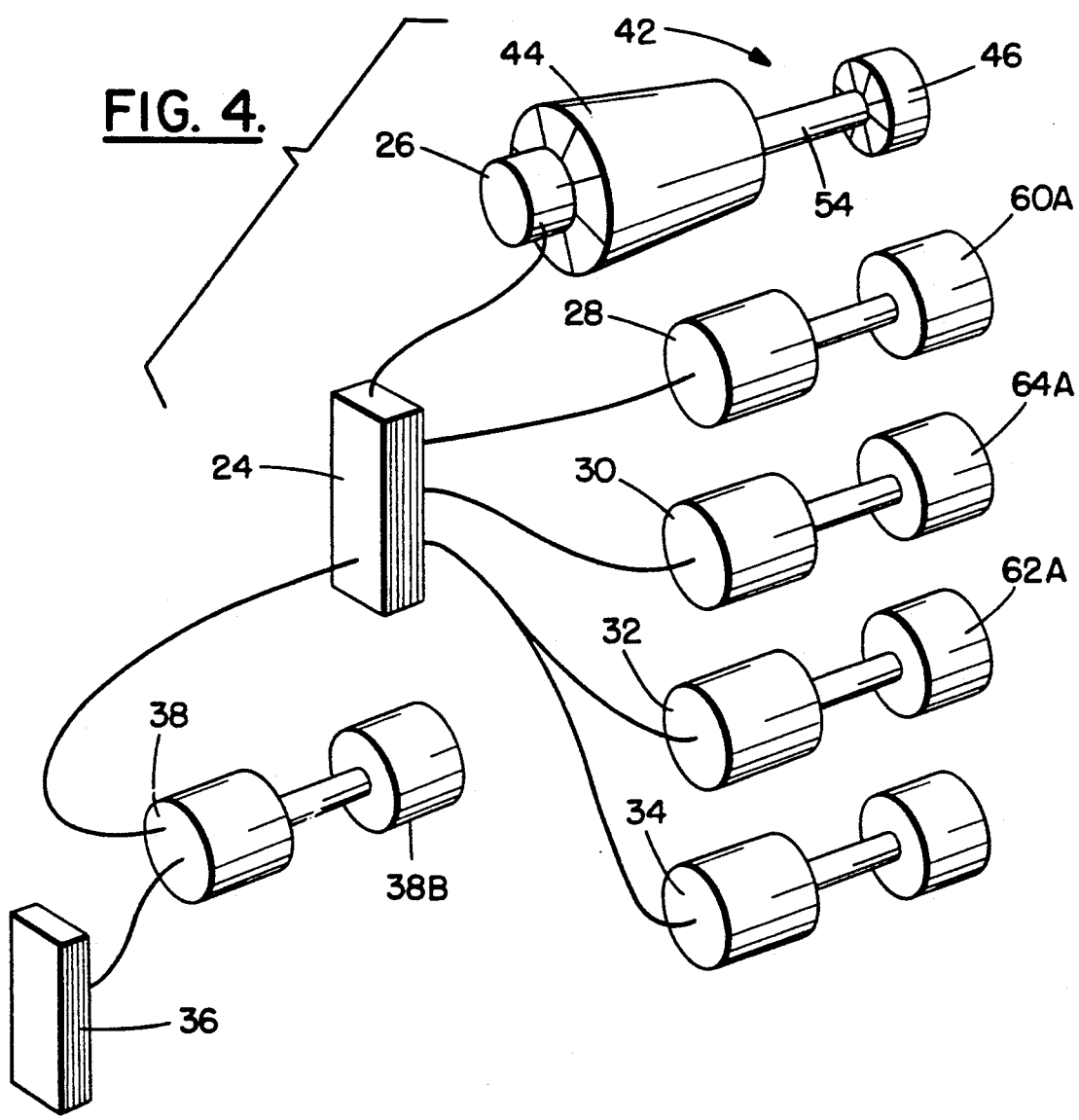
FIG. 4 is a diagrammatic representation of a plurality of engine accessories operated by the control system of the invention.

The present invention depicted in FIGS. 1 and 4 represents an improvement, also, over the system illustrated in FIG. 3.

Turn now to FIGS. 1 and 4 for a description of the operation of the control system 20 and its associated accessories for the gas turbine engine 42. As diagrammatically illustrated in FIG. 4, the starter/generator 26 is mechanically coupled for rotation with the power shaft 54. The coupling between the starter/generator and the power shaft may be direct or it may be through a suitable speed reducer. In any event, the rotation of the starter/generator is directly proportional to the rotational speed of the power shaft 54.

In order to start the engine 42, viewing especially FIG. 1, a switch 74 in the line between the motor controller 24 and the starter/generator 26 is closed. The switch 74 remains closed until engine speed is in the vicinity of 40% of its maximum operating speed, that is, the speed at which continued input from the motor controller 24 is no longer required for continued operation of the gas turbine engine. It will be appreciated that under normal operating conditions, the bearing surfaces for the engine 42 are considered to have adequate residual lubrication to assure their harm free operation for the first few moments of the start. A switch 75 may be necessary to isolate the voltage driving the starter/generator 26 from the input to the motor controllers 24, 36 and to the system electronic control 22. With opening of the switch 74, however, a switch 76 is closed thereby energizing the motor 28 for operating an associated oil pump 60A to which it is mechanically coupled.

By means of the motor controller 24, the motor 28 is brought up to speed at a predetermined, desirable rate. This rate of acceleration is chosen so as not to cause cavitation within the pump, while assuring optimum flow of lubricant to the bearings and other moving components of the engine. The acceleration rate is also chosen to assure that the drive mechanism for the pump will not be overtorqued and to prevent excessive electrical current to flow and excessive voltage drops in the electrical lines. When the oil pump motor shall have obtained a speed which is substantially synchronous with that of the starter/generator 26, the switch 76 is opened to electrically uncouple the motor 28 from the motor controller 24 and a switch 78 is closed to electrically couple the oil pump motor with the starter/generator, for synchronous operation therewith. When the oil to be pumped by the oil pump is initially sufficiently warm that initial oil pump viscous drag is substantially the same as normal operating drag, switches 74 and 76 may again be closed simultaneously for synchronous operation of the oil pump motor 28 and the starter/generator 26.

When the engine 42 is operating in a cold climate, or during cold weather in a temperate climate, it may desirable, prior to initiating operation of the starter/generator 26, to close switch 76 for a brief period of time to initiate operation of the oil pump motor 28 under the direction of the motor controller 24. In this instance, the switch 76 would only remain closed for a period of time sufficient to adequately wet the main bearings of the gas turbine engine so as to substantially avoid damage and wear thereto. When this has been accomplished, the procedure described above would then be followed.

After the closing of switch 78 to electrically couple the oil pump motor 28 to the starter/generator 26, a switch 80 may be closed to electrically couple the motor controller 24 with the motor 30 for operation of the inlet particle separator 64A. The function of the inlet particle separator is to remove dirt and other particles of debris from engine intake air. This is achieved by passing the inlet air at high speeds through a path designed with a special curvature that separate high speed solid particles from the engine inlet air. Once again, when the speed of the motor 30 is substantially synchronous with the starter/generator 26, the switch 80 is opened and a switch 82 closed to electrically uncouple the motor from the motor controller 24 and to electrically couple it to the starter/generator.

Again, a similar procedure may be performed for the motor 32 driving a cooling fan 62A by sequentially operating switches 84 and 86. In the instance of a cooling fan, it may be preferred not to operate it at a speed proportional to that of the engine 42. In such an instance, it may be desirable for the switch 84 to remain closed and the switch 86 to remain open so that the motor 32 and its associated cooling fan 62A remain under the guidance of the motor controller 24 so as to operate at a predetermined variable rate. It will be appreciated that operation of the cooling fan would be dependent upon the climate and also the altitude at which the engine 42 is operated. Indeed, in a cold climate or on a cold day, it may not be operated at all.

The motor 34 is representative of one or more motors for operating a variety of other accessories for the engine 42. Typical of one of a plurality of other such accessories is a variable geometry actuation system used to position variable stator vanes in the engine compressor to assure optimum engine performance. In any event, operation of the motor 34 in accordance with the invention would be achieved by operation of switches 88 and 90 in the general manner previously described.

It was noted above that the fuel pump motor 38 is provided with its own dedicated motor controller 36. Operation of the motor 38 is generally initiated upon closure of a switch 92. Because of the variable requirements for fuel throughout the operation of the engine 42, the fuel pump motor 38 remains at all times under the guidance of the motor controller 36.

However, in the event the motor controller 36 experiences a major malfunction, switch 92 can be opened and a switch 94 closed to thereby couple the motor controller 24 to the motor 38. In this manner, the motor controller 24 serves as a backup for the motor controller 36 in the event of an emergency. In this event, the motor controller 24 would be unavailable to start any other accessory motors which are not already in operation. While the other motors with which the motor controller 24 is normally associated are important, none of them command the highest level of importance enjoyed by the fuel pump motor.

While preferred embodiments of the invention have been disclosed in detail, it should be understood by those skilled in the art that various other modifications may be made to the illustrated embodiments without departing from the scope of the invention as described in the specification and defined in the appended claims.

We claim:

1. A method of operating a plurality of accessories associated with a gas turbine engine comprising the steps of:
    (a) coupling a source of electric power to a starter/generator mechanically coupled to the gas turbine engine to initiate operation of the starter/generator for starting the gas turbine engine;
    (b) uncoupling the source of electric power from the starter/generator when the gas turbine engine has attained a speed at which electric power is no longer required for continued operation of the gas turbine engine;
    (c) coupling the source of electric power to an oil pump motor to initiate operation thereof;
    (d) accelerating the oil pump motor to a speed which is substantially synchronous with the starter/generator;
    (e) uncoupling the source of electric power from the oil pump motor; and
    (f) substantially simultaneously with step (e), coupling the oil pump motor with the starter/generator for synchronous operation therewith.

2. A method as set forth in claim 1 wherein the starter/generator is a brushless permanent magnet motor.

3. A method as set forth in claim 1 including the steps of:
    (g) after step (f) coupling the source of electric power to an accessory motor to initiate operation thereof;
    (h) accelerating the accessory motor to a speed which is substantially synchronous with the starter/generator; and
    (i) uncoupling the source of electric power from the accessory motor; and
    (j) electrically coupling the accessory motor with the starter/generator for synchronous operation therewith.

4. A method as set forth in claim 1 including the steps of:
    (k) after steps (d), (e), and (f), electrically coupling the source of electric power, seriatim, to a plurality of accessory motors to initiate operation thereof;
    (l) in the instance of each accessory motor, accelerating the accessory motor to a speed which is substantially synchronous with the starter/generator;
    (m) in the instance of each accessory motor, uncoupling the source of electric power from the accessory motor; and
    (n) in the instance of each accessory motor, substantially simultaneously with step (m), coupling the accessory motor with the starter/generator for synchronous operation thereof.

5. A method as set forth in claim 1 including the steps of:
    (o) after steps (d), (e), and (f), coupling the source of electric power to an accessory motor to initiate operation thereof; and
    (p) thereafter, continuing to operate the accessory motor at a speed independent of the gas turbine engine.

6. A method as set forth in claim 1 wherein step (a) is performed by a first motor controller; and including the steps of:
    (q) coupling a source of electric power via a second motor controller to a fuel pump motor for continuously supplying the gas turbine engine with fuel for its operation; and
    (r) in the event of failure of the second motor controller, electrically coupling the source of electric power via the first motor controller to the fuel pump motor to assure its uninterrupted operation.

7. A method as set forth in claim 1 wherein step (d) includes the step of accelerating the oil pump motor at a rate to effect a predetermined optimum oil flow rate.

8. A method as set forth in claim 1 including the steps of:
    (s) before step (a), coupling the source of electric power to the oil pump motor only for a brief period of time sufficient to adequately wet the main bearings of the gas turbine engine to substantially avoid damage and wear thereto; and
    (t) thereafter uncoupling the source of electric power from the oil pump motor.

9. A method as set forth in claim 1 including the step of:
    (u) performing steps (a) and (c) simultaneously when the oil to be pumped by the oil pump is initially sufficiently warm that initial oil pump viscous drag is substantially the same as normal operating drag.

10. A method of operating a plurality of components operatively associated with a gas turbine engine comprising the steps of:
    (a) coupling a source of electric power to a starter/generator mechanically coupled to the gas turbine engine to initiate operation of the starter/generator for starting the gas turbine engine;
    (b) uncoupling the source of electric power from the starter/generator when the gas turbine engine has attained a speed at which continued input from the source of electric power is no longer required for continued operation of the gas turbine engine;
    (c) coupling the source of electric power to an accessory motor to initiate operation thereof; and
    (d) thereafter, continuing to operate the accessory motor at a speed independent of the gas turbine engine.

* * * * *